(12) United States Patent
Theis et al.

(10) Patent No.: US 9,657,626 B2
(45) Date of Patent: May 23, 2017

(54) EMISSIONS REDUCTION SYSTEM

(71) Applicant: Ford Global Technologies, LLC, Dearborn, MI (US)

(72) Inventors: Joseph Robert Theis, Rockwood, MI (US); Christine Kay Lambert, Dearborn, MI (US); Douglas Allen Dobson, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 14/714,757

(22) Filed: May 18, 2015

(65) Prior Publication Data

US 2016/0341091 A1    Nov. 24, 2016

(51) Int. Cl.
*F01N 3/28*     (2006.01)
*F01N 3/20*     (2006.01)
(Continued)

(52) U.S. Cl.
CPC ....... *F01N 3/2066* (2013.01); *B01D 53/9477* (2013.01); *F01N 3/0842* (2013.01); *B01D 53/944* (2013.01); *B01D 53/9418* (2013.01); *B01D 53/9468* (2013.01); *B01D 53/9472* (2013.01); *B01D 53/9481* (2013.01); *B01D 2255/1021* (2013.01); *B01D 2255/1023* (2013.01); *B01D 2255/206* (2013.01); *B01D 2255/2065* (2013.01); *B01D 2255/9022* (2013.01); *B01D 2255/9032* (2013.01); *B01D 2255/91* (2013.01); *B01D 2257/402* (2013.01); *B01D 2257/404* (2013.01);
(Continued)

(58) Field of Classification Search
CPC ............ B01D 53/9418; B01D 53/9468; B01D 53/9472; B01D 53/9477; B01D 53/9481; B01D 2255/1023; B01D 2255/206; B01D 2255/9022; B01D 2255/9032; B01D 2255/91; B01D 2257/402; B01D 2257/404; B01J 23/44; B01J 23/54; B01J 23/63; B01J 2523/824; F01N 3/0814; F01N 3/0842; F01N 3/103; F01N 3/106; F01N 3/108; F01N 3/2066; F01N 13/009; F01N 13/0097; F01N 2250/12; F01N 2510/0684; F01N 2570/14; F01N 2570/145
USPC .......................... 60/274, 286, 295, 299, 301
See application file for complete search history.

(56) References Cited

U.S. PATENT DOCUMENTS 7,594,392 B2   9/2009  Wang et al.
8,661,797 B2   3/2014  Gonze et al.
(Continued)

*Primary Examiner* — Jorge Leon, Jr.
(74) *Attorney, Agent, or Firm* — Damian Porcari; Brooks Kushman P.C.

(57) ABSTRACT

An exhaust system for a diesel engine is disclosed. The exhaust system may include a diesel oxidation catalyst (DOC) configured to receive exhaust gases from the engine and oxidize hydrocarbons in the exhaust gases and a passive NOx adsorber (PNA) downstream from the DOC and configured to store NOx from the exhaust gases at temperatures up to 150° C. A selective catalytic reduction (SCR) system may be downstream from the PNA and configured to reduce NOx in the exhaust gases. The PNA may be configured to release the stored NOx at temperatures above 200° C. The DOC upstream of the PNA may reduce the amount of $N_2O$ that is generated by the PNA by oxidizing hydrocarbons before they reach the PNA.

17 Claims, 4 Drawing Sheets

(51) Int. Cl.
*F01N 3/10* (2006.01)
*B01D 53/94* (2006.01)
*B01J 23/63* (2006.01)
*F01N 13/00* (2010.01)
*B01J 23/54* (2006.01)
*F01N 3/08* (2006.01)
*B01J 23/44* (2006.01)

(52) U.S. Cl.
CPC .. *B01D 2257/502* (2013.01); *B01D 2257/702* (2013.01); *B01D 2258/012* (2013.01); *B01J 23/44* (2013.01); *B01J 23/54* (2013.01); *B01J 23/63* (2013.01); *B01J 2523/824* (2013.01); *F01N 3/0814* (2013.01); *F01N 3/103* (2013.01); *F01N 3/106* (2013.01); *F01N 3/108* (2013.01); *F01N 13/0097* (2014.06); *F01N 2250/12* (2013.01); *F01N 2510/0684* (2013.01); *F01N 2570/14* (2013.01); *F01N 2570/145* (2013.01)

(56) References Cited

U.S. PATENT DOCUMENTS

| | | | |
|---|---|---|---|
| 2001/0022956 A1* | 9/2001 | Okamoto | B01D 53/9422 423/213.5 |
| 2004/0254073 A1* | 12/2004 | Wei | B01D 53/9431 502/303 |
| 2007/0089403 A1* | 4/2007 | Pfeifer | B01D 53/9418 60/286 |
| 2009/0255238 A1* | 10/2009 | Ogai | B01D 53/8628 60/299 |
| 2009/0320457 A1* | 12/2009 | Wan | B01D 53/9422 60/299 |
| 2010/0221154 A1* | 9/2010 | Lee | B01D 53/945 422/177 |
| 2011/0173950 A1 | 7/2011 | Wan et al. | |
| 2011/0179777 A1* | 7/2011 | Chandler | F01N 3/0222 60/297 |
| 2012/0023909 A1* | 2/2012 | Lambert | B01D 53/9468 60/274 |
| 2012/0240554 A1* | 9/2012 | Qi | B01D 53/9422 60/274 |
| 2012/0255283 A1* | 10/2012 | Oger | B01D 53/945 60/274 |
| 2013/0028818 A1* | 1/2013 | Eckhoff | F01N 3/0814 423/212 |
| 2013/0089481 A1* | 4/2013 | Sumiya | B01J 37/0244 423/213.5 |
| 2013/0202507 A1* | 8/2013 | Echoff | F01N 3/0814 423/213.5 |
| 2014/0090374 A1 | 4/2014 | Chavannavar | |
| 2014/0161695 A1 | 6/2014 | Hilgendorff et al. | |
| 2014/0278003 A1 | 9/2014 | Kim et al. | |
| 2016/0167022 A1* | 6/2016 | Chiffey | B01J 37/0244 423/213.2 |
| 2016/0222852 A1* | 8/2016 | Ren | F01N 3/0842 |

* cited by examiner

US 9,657,626 B2

EMISSIONS REDUCTION SYSTEM

TECHNICAL FIELD

The present disclosure relates to an emissions reduction system, for example, for diesel engines.

BACKGROUND

Diesel engines generally operate at a lower temperature and run leaner compared to conventional gasoline engines. While gasoline engines may put out more NOx on a ppm basis due to higher combustion temperatures, the three-way catalyst may reduce the NOx with high efficiency when the A/F ratio is at stoichiometry. Consequently, the $NO_x$ emissions from the catalyst-equipped gasoline engine can be lower than the NOx emissions from a diesel engine. Since diesels operate lean, the three-way catalyst may not reduce NOx. The reduction of NOx emissions is therefore a unique challenge for diesel engines. One approach to NOx reduction on diesel engines is the use of selective catalytic reduction (SCR) systems. SCR systems with urea injection may be very effective for reducing NOx under lean conditions once the temperature of the SCR catalyst is above a minimum operating level (e.g., 150° C. or 200° C.). However, before the SCR catalyst has reached this operating temperature, much of the NOx in the exhaust passes through the SCR catalyst without being reduced and is emitted from the vehicle.

SUMMARY

In at least one embodiment, an exhaust system for a diesel engine is provided. The system may include a diesel oxidation catalyst (DOC) configured to receive exhaust gases from the engine and oxidize hydrocarbons in the exhaust gases and a passive NOx adsorber (PNA) downstream from the DOC and configured to store NOx from the exhaust gases at temperatures up to 150° C. A selective catalytic reduction (SCR) system may be downstream from the PNA and configured to reduce NOx.

In one embodiment, the PNA is configured to store NOx from the exhaust gases at temperatures up to 180° C. In another embodiment, the PNA is configured to release the stored NOx at temperatures above 200° C. The PNA may be configured to release substantially all stored NOx at a temperature of 350° C. or less. The DOC may have a palladium to platinum content of over 1:1, such as at least 3:1. The PNA may have a palladium to platinum content of at least 3:1. The exhaust system may emit less than 10 ppm of $N_2O$ during the first 2,000 seconds after engine start.

In one embodiment, the DOC may be coupled to the PNA by an exhaust conduit. In another embodiment, the DOC and the PNA may be contained in a single housing. The DOC and the PNA may be formed as layers on a single substrate. The PNA may contain substantially no alkali metals or alkaline-earth metals, such as barium. The PNA may contain one or more rare earth elements, such as cerium.

In at least one embodiment, a process of treating exhaust from a diesel engine is provided. The process may include introducing a first exhaust gas (FEG) to a diesel oxidation catalyst (DOC) from the engine to generate a second exhaust gas (SEG) and introducing the SEG to a passive NOx adsorber (PNA) from the DOC to generate a third exhaust gas (TEG). The PNA may store NOx from the SEG at temperatures up to 150° C. The TEG may be introduced to a NOx reduction system from the PNA.

In one embodiment, at temperatures above 200° C. the PNA releases stored NOx into the TEG. At a temperature of 400° C. or less, the PNA may release substantially all stored NOx into the TEG. In one embodiment, during a first 2,000 seconds after starting the diesel engine, an output exhaust gas (OEG) from the NOx reduction system includes less than 10 ppm of $N_2O$. The diesel engine may substantially always run with a lean air to fuel ratio.

In at least one embodiment, an exhaust system for treating exhaust gases from a diesel engine is provided. The system may include a passive NOx adsorber (PNA) layer disposed on a substrate and configured to store NOx from the exhaust gases at temperatures up to 150° C. and a diesel oxidation catalyst (DOC) layer disposed on the PNA layer and configured to oxidize hydrocarbons in the exhaust gases. A selective catalytic reduction (SCR) system may be downstream from the PNA and DOC layers and configured to reduce NOx in the exhaust gases. In one embodiment, the PNA and DOC layers may each have a palladium to platinum content of at least 3:1 and the PNA layer may include substantially no alkali metals or alkaline-earth metals.

DETAILED DESCRIPTION

Figure 1:
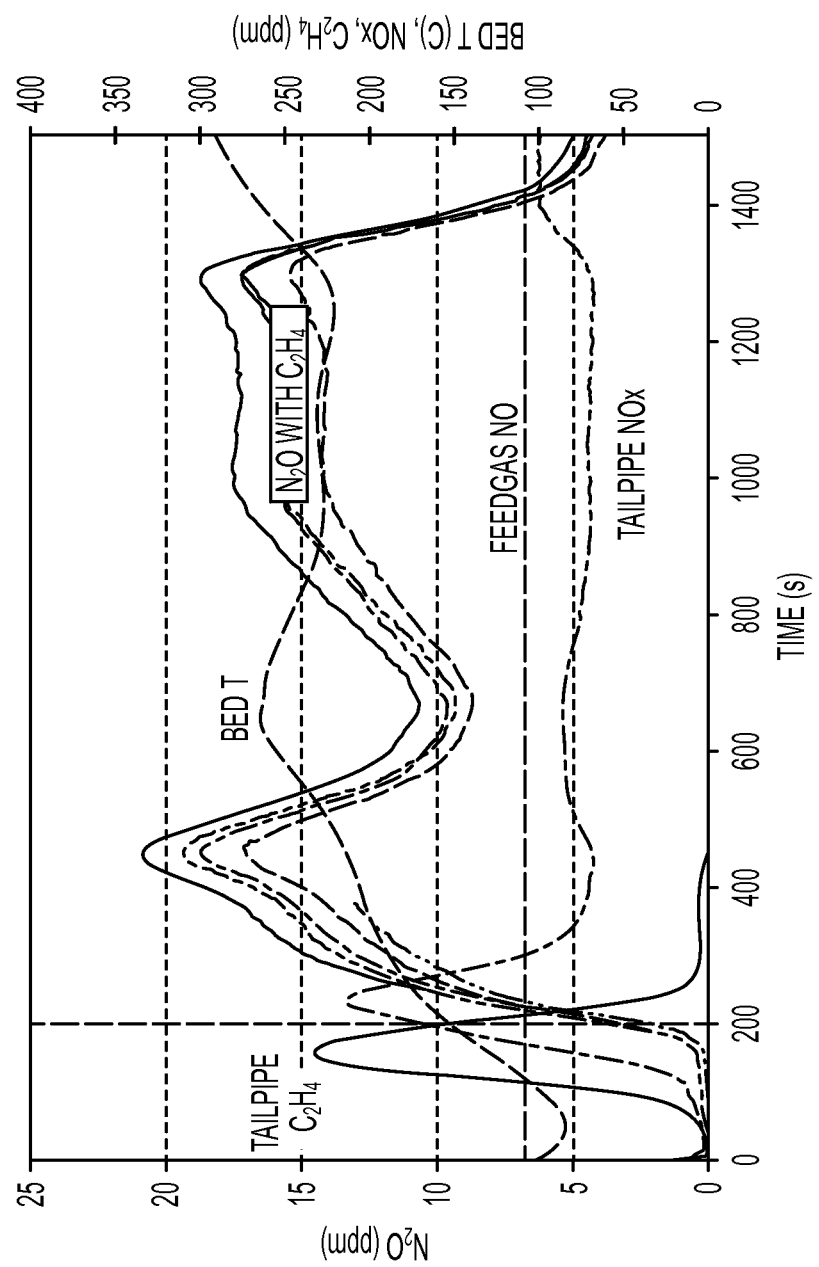
FIG. 1 shows levels of $N_2O$ emitted from a passive NOx adsorber (PNA) over time during a laboratory test when tested with 100 ppm NO and 250 ppm $C_2H_4$ in the feedgas.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The time period during which the SCR catalyst is not yet up to its minimum operating level may be referred to as the "cold start" time period. The cold start period may last up to several minutes, for example, up to about 200 seconds. The primary pollutants that are emitted from a diesel engine are hydrocarbons (HC), carbon monoxide (CO), nitrogen oxides (NOx), and particulate matter (e.g., soot). As described in the Background, during the cold start period, the exhaust temperatures are too low for the SCR catalyst to reduce NOx, so the NOx is released into the atmosphere. A Passive NOx Adsorber (PNA) may be added to the exhaust system to adsorb and store at least some of the engine-out NOx during this cold start period. The PNA may contain platinum (Pt) and/or palladium (Pd) and NOx storage materials (e.g., ceria). Unlike the SCR system, the objective for the PNA is to store NOx and then release it at a later time, not to reduce or oxidize the NOx itself. The PNA may store the NOx until after the urea injection system is operational and the downstream SCR catalyst has reached its operating temperature (e.g., at least 150° C. or 200° C.), at which time the NOx is released from the PNA. The PNA therefore stores the NOx that would otherwise have passed through the SCR system unreacted until the SCR catalyst has reached a temperature that allows it to reduce the NOx that is released from the PNA.

The PNA was designed to replace the diesel oxidation catalyst (DOC) that has typically been the first catalyst brick in the diesel aftertreatment system. Therefore, in addition to storing and releasing NOx during the cold start period, the PNA is also configured to provide the DOC functions of oxidizing HC and carbon monoxide (CO). In addition, once the exhaust system is warmed up (e.g., about 200° C.), the Pt in the PNA may oxidize a portion of the engine-out NO to $NO_2$ and thereby provide a mixture of NO and $NO_2$ to the SCR catalyst, which improves its NOx reduction capability at low temperatures.

However, when the PNA is used as the first brick in the exhaust system, it is continually exposed to the full concentration of NOx and HC emitted from the engine. After the cold start period is over (e.g., about 200 seconds) and the exhaust system is up to full operating temperature, it has been discovered that the PNA can generate $N_2O$ as a result of a reaction between the hydrocarbons and NOx at temperatures around 200° C. This reaction may be referred to as lean NOx catalysis or hydrocarbon-SCR. This reaction has been found to be more pronounced over platinum than over palladium. The production of $N_2O$ is undesirable, since $N_2O$ is a very effective greenhouse gas. For example, $N_2O$ is hundreds of times more effective at trapping heat than carbon dioxide.

FIG. 1 shows the $N_2O$ formation from a passive NOx adsorber during several temperature ramp tests on a laboratory reactor, where the oven temperature was ramped from 70° C. to 175° C. at 10° C./min, held for 10 minutes, and then ramped from 175 to 300° C. at 10° C./min and held there for 5 minutes. This test exposes the PNA to a subset of the temperatures to which it will be exposed during phases 1 and 2 of the Federal Test Procedure (FTP) and during the US06 test, a Supplemental Federal Test Procedure (SFTP). The exhaust contained 250 ppm ethylene ($C_2H_4$), 100 ppm NO, 10% $O_2$, 5% $CO_2$ and $H_2O$, and the balance $N_2$. In addition to the $N_2O$ emissions, FIG. 1 also shows the feedgas NO, the tailpipe NOx, the tailpipe $C_2H_4$, and the bed temperature from one of the tests.

As shown in FIG. 1, the PNA stored NOx effectively during the first 100 to 120 seconds of the test and then released some of the stored NOx between 150 and 300 seconds. It also stored the $C_2H_4$ effectively for about 100 seconds. The $N_2O$ formation was very low during the first 180 seconds. However, after 180 seconds, the PNA began to generate significant levels of $N_2O$; the $N_2O$ was between 15 and 20 ppm when the bed temperature was between 180 and 230° C. and decreased to around 10 ppm as the bed temperature increased to a temperature near 250° C. As the temperature approached 300° C. near the end of the test, the $N_2O$ formation dropped to about 5 ppm. When the test was run with the NO but without the $C_2H_4$, there was no $N_2O$ formation. This indicated that the $N_2O$ resulted from the reaction between NOx and HC. It has been found that this reaction occurs over the palladium and platinum of the PNA, but that platinum causes more $N_2O$ to be generated than palladium.

Figure 2:
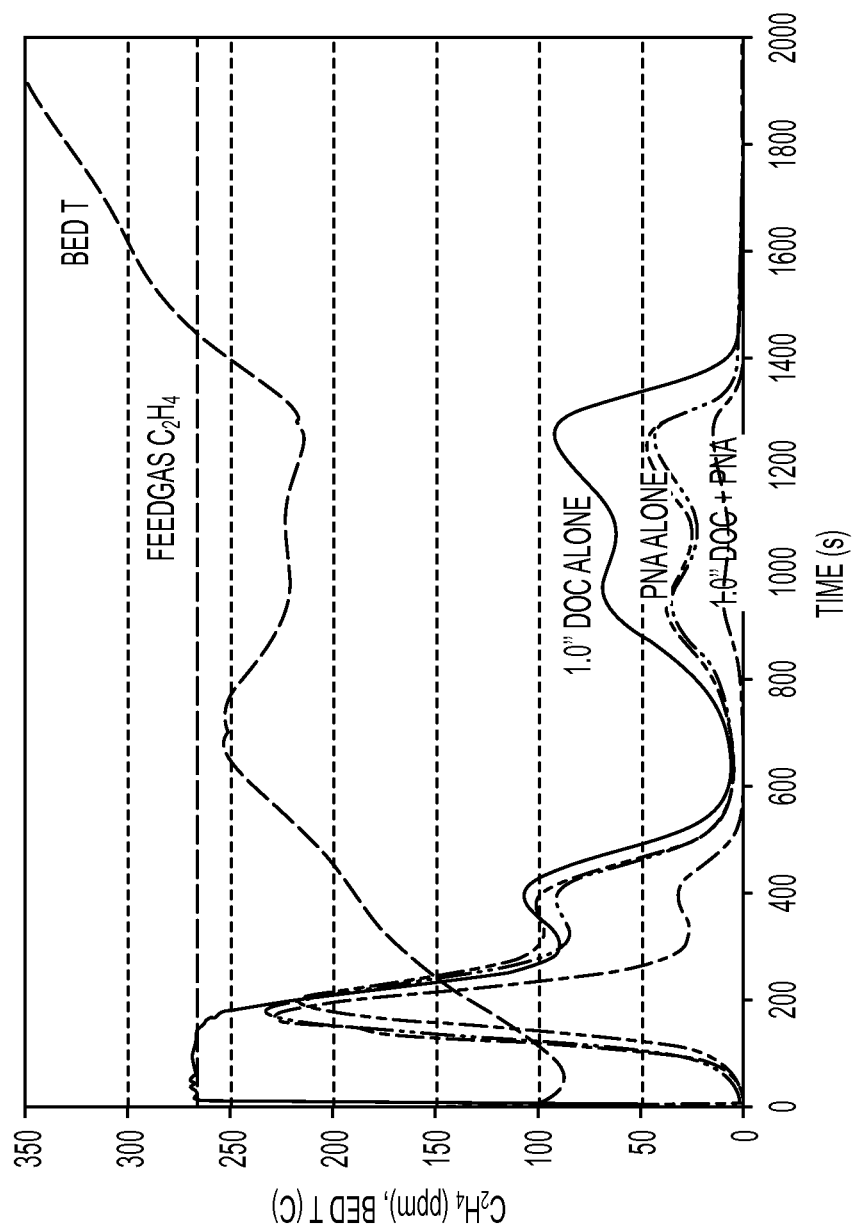
FIG. 2 shows levels of a hydrocarbon, $C_2H_4$, over time from a diesel oxidation catalyst (DOC) alone, a PNA alone, and a combination DOC and PNA during a laboratory test.

It has been discovered that the $N_2O$ formation by the PNA can be decreased by placing a Pd-rich DOC in front of the PNA. The DOC, once at its operating temperature, may oxidize the hydrocarbons upstream of the PNA to carbon dioxide and water, thereby eliminating or reducing the amount of HC available to react with NOx (e.g., NO) over the PNA to form $N_2O$. With reference to FIG. 2, an aged DOC with 175 gpcf platinum group metal (PGM) with a platinum/palladium ratio of 1 to 4 was placed in front of the PNA, and another ramp test was performed. FIG. 2 shows the feedgas $C_2H_4$, the $C_2H_4$ after the DOC alone, the $C_2H_4$ after the PNA alone, and the $C_2H_4$ after the DOC+PNA combination. Without the DOC, the $C_2H_4$ concentration entering the PNA alone was the full feedgas level of 267 ppm. But with the DOC in front of the PNA, the $C_2H_4$ concentration entering the PNA from 600 seconds and on was between 0 and 100 ppm (i.e., indicated by the curve labeled "DOC alone"). It is noted that the $C_2H_4$ from the DOC+PNA combination was very low beyond 600 seconds, which is an additional advantage of placing the DOC in front of the PNA.

Figure 3:
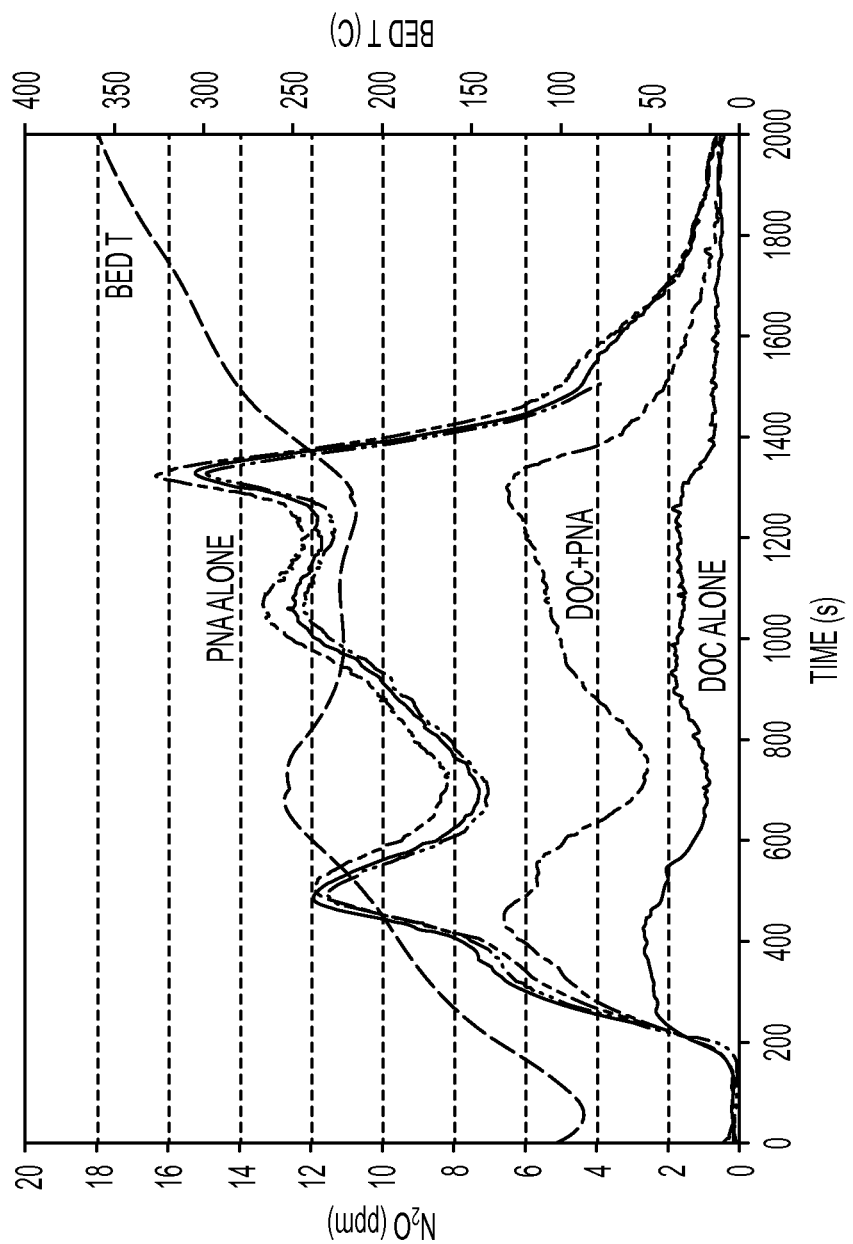
FIG. 3 shows levels of $N_2O$ emitted from a DOC alone, a PNA alone, and a combination DOC and PNA over time during a laboratory test.

FIG. 3 compares the $N_2O$ without the DOC (similar to the data from FIG. 1) to the $N_2O$ with the DOC ahead of the PNA. FIG. 3 also shows the $N_2O$ formed by the DOC alone, which was quite small. The DOC+PNA combination produced much less $N_2O$ than the PNA alone. While not shown here, the DOC had essentially no effect on the NOx concentration entering the PNA. Therefore, the drop in $N_2O$ can be attributed solely to the DOC oxidizing some of the $C_2H_4$ and thereby decreasing the reaction between NOx and $C_2H_4$ over the PNA to form $N_2O$. It has therefore been discovered that rather than placing the PNA as the first catalyst in the aftertreatment system, a Pd-rich DOC may be placed in front of the PNA to minimize the $N_2O$ formation and to improve the HC conversion. The disclosed arrangement may also be beneficial for the durability of the PNA. The DOC may perform much of the exothermic oxidation reactions during warmed-up operation, especially during the regeneration of a diesel particulate filter (DPF). A DPF may be located downstream or upstream from the SCR system, depending on the application. The DOC may generate hot exhaust during DPF regenerations, and that hot exhaust may pass through the PNA and SCR before entering the DPF (if downstream from the SCR). The DOC may protect the PNA because the DOC performs the exothermic reactions instead of the PNA. The exothermic reactions can create high temperatures on the PGM sites, which may damage them. As such, the DOC may protect the PNA from such exothermic reactions.

With reference to FIGS. 4-7, several embodiments of an exhaust system 10 are disclosed. In at least one embodiment, the exhaust system 10 is a diesel engine exhaust system. The exhaust system 10 may be connected to the outlet of an engine 12, which may be a diesel engine. The system 10 may include a diesel oxidation catalyst (DOC) 14 and a Passive NOx Adsorber (PNA) 16. In the embodiments shown, the system 10 also includes a selective catalytic reduction (SCR) system 18 downstream from the DOC 14 and PNA 16. The SCR system 18 may include a reductant injection system and an SCR catalyst downstream from the reductant injection system. The reductant injection system may introduce a reductant into the exhaust gases. The reductant may be a fluid, such as anhydrous ammonia, aqueous ammonia, or urea. Alternatively, a solid reductant may be used, which may not require an injection system. The SCR catalyst may reduce the NOx to form nitrogen, water, and/or carbon dioxide, depending on the reductant. While not shown, the SCR system 18 may be replaced or supplemented with a lean NOx trap (LNT), or other known NOx reduction devices. A LNT is a device that is designed to adsorb and reduce NOx at elevated temperatures (e.g., above 200° C.). LNTs generally operate by adsorbing NOx during lean engine operation and reducing the NOx during rich engine operation. Thereby, the LNT may be "regenerated" by alternating between lean and rich engine operation. The LNT may adsorb NOx as nitrates, which are relatively stable and require the rich cycle to reduce the nitrates. LNTs are generally platinum and/or barium heavy. LNTs do not begin to operate until the system is warmed up, and therefore have little to no impact on cold start emissions.

In contrast to LNTs, PNAs 16 are configured or adapted to operate at low temperatures, such as up to 150° C., 180° C., or 200° C. In addition, PNAs do not reduce NOx; they simply store the NOx during cold start temperatures and release the NOx at higher temperatures. By storing the NOx at low temperatures, the PNA gives the SCR system 18 (or other downstream system(s)) time to warm up. Once the downstream systems have reached their operating temperature, the PNA releases the stored NOx and allows the downstream systems to reduce, oxidize, or otherwise react the NOx into less harmful substances. The PNA 16 may be passive, in that it does not require any energy input, change in fuel composition, or other active steps to operate. This is in contrast to LNTs, which require alternating between lean and rich operation to regenerate the trap. Also, the PNA 16 may adsorb the NOx as nitrites, instead of nitrates (like LNTs). Nitrites may be less stable, allowing them to be released without a rich fuel cycle. By operating at low temperatures, the PNA may have a significant impact on NOx emissions directly after engine start, such as the first 100, 150, or 200 seconds. While this might seem like a short timeframe, relatively large amounts of harmful emissions may be released into the atmosphere during this time period due to the relative ineffectiveness of other emissions systems during the cold start. Since most of the tailpipe emissions from the vehicle may be emitted during the cold start period, reducing the cold start emissions can be important in meeting strict emission standards.

Figure 4:
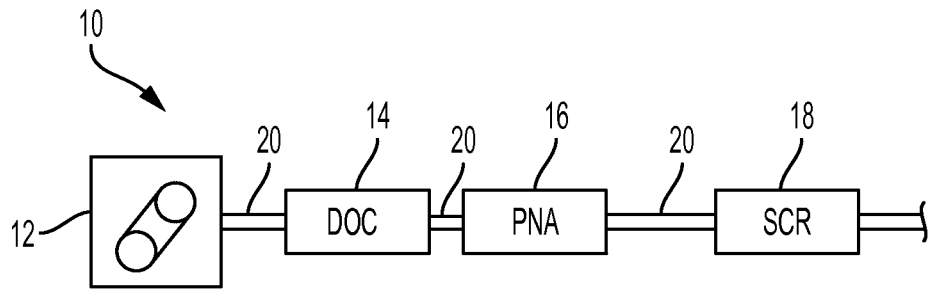
FIG. 4 is a schematic of an exhaust system including a separate DOC and PNA, according to an embodiment.

With reference to FIG. 4, an embodiment of the system 10 is disclosed in which a DOC 14 is downstream from the engine 12 and a PNA 16 is downstream from the DOC 14. In this embodiment, the DOC 14 and PNA 16 are separate components, which may be connected by an exhaust tube, pipe, conduit, or hose 20. The DOC 14 may be referred to as a first or front brick and the PNA 16 may be referred to as a second or rear brick. Downstream from the PNA 16 is a SCR system 18, although additional or other systems may also be included (e.g., an LNT and/or DPF).

Figure 5:
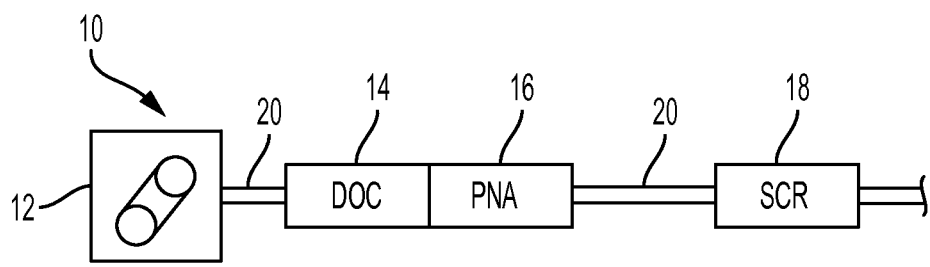
FIG. 5 is a schematic of an exhaust system including a connected DOC and PNA, according to an embodiment.

With reference to FIG. 5, an embodiment of the system 10 is disclosed in which a DOC 14 is downstream from the engine 12 and a PNA 16 is downstream from the DOC 14. In this embodiment, the DOC 14 and PNA 16 are separate components but are directly connected end-to-end in the same catalytic converter, such that no exhaust pipe is present between them. The DOC 14 and PNA 16 may be on separate substrates or zone-coated onto a single substrate. The DOC 14 may be referred to as the front or first zone and the PNA 16 may be referred to as the second or rear zone of the brick. Downstream from the PNA 16 is a SCR system 18, although additional or other systems may also be included (e.g., an LNT and/or DPF).

Figure 6:
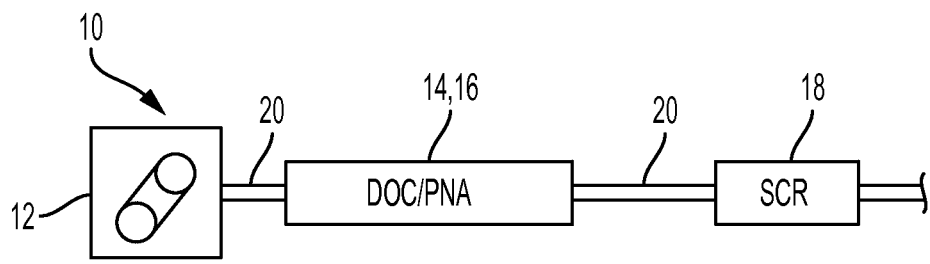
FIG. 6 is a schematic of an exhaust system including a combined DOC and PNA, according to an embodiment.
Figure 7:
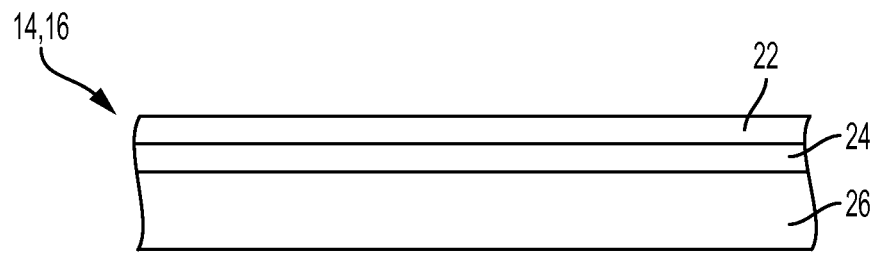
FIG. 7 is a schematic cross-section of the combined DOC and PNA in FIG. 6, showing a DOC layer over a PNA layer.

With reference to FIGS. 6 and 7, an embodiment of the system 10 is disclosed in which a DOC 14 and a PNA 16 are combined into a single component or brick. In this embodiment, the DOC 14 may be formed as a layer 22 disposed over, on top of, or covering a PNA layer 24, which is disposed over, on top of, or covering a substrate 26. Accordingly, the DOC 14 may still be considered to be "upstream" from the PNA 16, because the exhaust gas will encounter and react with the DOC layer 22 first and the PNA layer 24 second. FIG. 7 shows a schematic cross-section of the substrate 26, PNA layer 24, and DOC layer 22. The substrate 26 may be similar to the substrates disclosed for the DOC 14 and PNA 16. The DOC layer 22 and the PNA layer 24 may be formed of similar components as the DOC 14 and PNA 16, described below (e.g., washcoat and catalyst). While the layers are shown as flat and uniform in thickness, the layers may also have a rough surface and/or have varying thicknesses throughout.

DOCs are known in the art and will not be described in detail. The DOC 14 may be any device that is configured to oxidize hydrocarbons (HC) and carbon monoxide (CO) to form carbon dioxide ($CO_2$) and water ($H_2O$). The DOC 14 may be a pass-through device having a substrate and an active layer including one or more catalyst materials. The DOC 14 may not contain materials that store NOx, such as cerium. The substrate may have a plurality of channels or openings through which the exhaust gas passes. The substrate may be a monolith or extruded material, such as cordierite. The active layer may be applied to the substrate using a washcoat. While DOCs typically include platinum and palladium as the primary catalyst materials, in at least one embodiment, the DOC 14 may have more palladium than platinum (e.g., Pd:Pt ratio of >1). For example, the DOC 14 may have a Pd:Pt ratio of at least 2:1, 3:1, 4:1, or greater. In another embodiment, the DOC may include no platinum, or substantially no platinum (e.g., less than 1 wt. % of total catalyst material). As described above, it has been discovered that the use of platinum results in greater $N_2O$ production, compared to other catalysts. Accordingly, by reducing the amount of Pt in the DOC 14, the total $N_2O$ production may be reduced.

The PNA 16 may be any device that is configured to store NOx at relatively low temperatures, such as up to 150° C., 180° C. or 200° C. and begin to release the NOx at temperatures where other emissions systems start to operate, such as 180° C. or 200° C. For example, the PNA 16 may be configured to store NOx at temperatures from 0° C. or 20° C. to 150° C., 180° C., or 200° C. The PNA 16 may store and release the NOx by adsorption and desorption. In one embodiment, all or substantially all (e.g., at least 95%) of the stored NOx may be released by the PNA 16 at a temperature of up to 450° C., such as up to 400° C., or up to 350° C. The PNA 16 may store the NOx as nitrites or nitrates. The PNA 16 may be a pass-through device having a substrate and an active layer including one or more catalyst materials. The substrate may have a plurality of channels or openings through which the exhaust gas passes. The substrate may be a monolith or extruded material. Non-limiting examples of suitable substrate materials include cordierite, aluminum titanate, and silicon carbide. The active layer may be applied to the substrate using a washcoat.

The PNA 16 may include catalyst materials including platinum, palladium, and rhodium. In at least one embodiment, the PNA 16 may have more palladium than platinum (e.g., Pd:Pt ratio of >1). For example, the PNA 16 may have a Pd:Pt ratio of at least 2:1, 3:1, 4:1, or greater. In another embodiment, the PNA 16 may include no platinum, or substantially no platinum. The washcoat used to apply the active material may include materials such as alumina (e.g., $Al_2O_3$) and/or cerium oxide (e.g., $CeO_2$), or other rare earth elements or oxides thereof. In at least one embodiment, the washcoat may have little or no alkali metals or alkaline-earth metals, such as barium. For example, the washcoat may have more alumina and/or cerium oxide than alkali metals or alkaline-earth metals (e.g., barium). In one embodiment, the washcoat includes less than 5 wt. % alkali metals or alkaline-earth metals (e.g., barium), such as less than 1 wt. % or no alkali metals or alkaline-earth metals (e.g., 0 wt. %), such as barium. Alkali metals or alkaline-earth metals may store NOx, but require high temperatures to release it, which may make them unsuitable for use in a PNA. As described above, it has been discovered that the use of platinum results in greater $N_2O$ production, compared to other catalysts. Accordingly, by reducing the amount of Pt in the PNA 16, the total $N_2O$ production may be reduced.

As described above, SCR systems 18 are well known in the art, and will not be described in detail. In general, SCR systems convert NOx into nitrogen, water, and carbon dioxide, depending on the system, using a catalyst and a reductant. The reductant is typically anhydrous ammonia, aqueous ammonia, or urea and may be added to a stream of flue or exhaust gas. SCR catalysts may include, zeolites or oxides of base metals. For example, zeolites including copper or iron or oxides of vanadium, molybdenum and tungsten may be used. As described above, the system 10 may include an SCR system 18 downstream from the DOC 14 and PNA 16. Additional NOx reduction systems may also be included downstream of the DOC 14 and PNA 16, either upstream or downstream from the SCR system 18. Alternatively, the SCR system 18 may be replaced by one or more other NOx reduction systems, for example, a LNT.

Embodiments of a system 10 for reducing NOx, and particularly $N_2O$, emissions have been disclosed. The systems 10 may include a DOC 14 upstream from a PNA 16, which is upstream from a NOx reduction device, such as an SCR system 18. It has been discovered that PNAs can generate $N_2O$, a powerful greenhouse gas, when the PNA receives both hydrocarbons and NOx from the engine 12. The $N_2O$ production may be greater when the PNA is platinum-heavy.

The disclosed systems 10 address this problem by including a DOC 14 upstream from the PNA 16, instead of the PNA replacing the DOC. The DOC 14, once at its operating temperature, oxidizes most or all of the HC before they reach the PNA 16, thereby drastically reducing the amount of one of the reactants in the reaction that forms $N_2O$ over the PNA 16. The systems 10 therefore address several challenges facing diesel engine exhaust systems. As just described, the systems 10 greatly reduce the amount of $N_2O$ produced and emitted into the atmosphere by providing a combination of a DOC and a PNA, with the DOC reducing the amount of hydrocarbons received by the PNA. The DOC may oxidize HC once it warms to it operating temperature, such as at temperatures of 200° C. and above. This includes the DOC reducing the HC received by the PNA while the PNA is in the temperature range of about 200 to 250° C., where $N_2O$ production is the greatest.

In addition, the PNA 16 facilitates greatly reduced NOx emissions from the system 10 during the cold start period (e.g., the first 200 seconds). The PNA 16 adsorbs the NOx at low temperatures, such as up to 150° C., 180° C. or 200° C. This time period is critical, because the downstream systems, such as a SCR system 18, are not effective at reducing the NOx until a minimum operating temperature is reached (e.g., about 200° C.). Therefore, any NOx that is passed to the SCR system 18 during the cold start will not be reduced and will be emitted from the vehicle. The PNA 16 adsorbs and holds the NOx during this cold start period and then releases it once the temperature of the system has reached a level where the downstream components are effective. Accordingly, the disclosed systems 10 provide NOx reduction during both "cold" and "hot" engine operation, while also greatly reducing the production of $N_2O$ by the PNA 16. The DOC may also protect the PNA from high temperatures and helps its durability. For example, the PNA may be located in a remote location from the DOC (e.g., connected by a conduit), which may lower the temperatures experienced by the PNA. Very high temperatures, such as over 700° C. or 800° C., may damage or reduce the durability of the precious metal catalysts in the PNA.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A diesel engine exhaust system, comprising:
   a diesel oxidation catalyst (DOC) brick configured to receive exhaust gases from a diesel engine and oxidize hydrocarbons therein;
   a passive NOx adsorber (PNA) brick separate and downstream from the DOC brick and configured to store NOx from the exhaust gases up to 150° C.; and
   a selective catalytic reduction (SCR) system downstream from the PNA brick and configured to reduce NOx in the exhaust gases;
   wherein the PNA brick includes palladium and platinum and has a palladium to platinum content of at least 3:1.

2. The system of claim 1, wherein the PNA brick is configured to store NOx from the exhaust gases at temperatures up to 180° C.

3. The system of claim 1, wherein the PNA brick is configured to release the stored NOx at temperatures above 200° C.

4. The system of claim 1, wherein the DOC brick includes palladium and substantially no platinum.

5. The system of claim 1, wherein the DOC brick includes palladium and platinum and has a palladium to platinum content of at least 3:1.

6. The system of claim 1, wherein the diesel engine exhaust system emits less than 10 ppm of $N_2O$ throughout a first 2,000 seconds after engine start.

7. The system of claim 1, wherein the DOC brick is coupled to the PNA brick by an exhaust conduit.

8. The system of claim 1, wherein the DOC brick and the PNA brick are contained in a single housing.

9. The system of claim 1, wherein the PNA brick is configured to release substantially all stored NOx at a temperature of 350° C. or less.

10. The system of claim 1, wherein the PNA brick contains substantially no alkali metals or alkaline-earth metals.

11. The system of claim 1, wherein the PNA brick contains one or more rare earth elements.

12. A process, comprising:
introducing a first exhaust gas (FEG) from a diesel engine to a diesel oxidation catalyst (DOC) front-brick to generate a second exhaust gas (SEG);
introducing the SEG to a passive NOx adsorber (PNA) rear-brick downstream from the DOC front-brick to generate a third exhaust gas (TEG), the PNA rear-brick storing NOx from the SEG up to 150° C.; and
introducing the TEG to a NOx reduction system from the PNA rear-brick;
wherein throughout a first 2,000 seconds after starting the diesel engine, an output exhaust gas (OEG) from the NOx reduction system includes less than 10 ppm of $N_2O$.

13. The process of claim 12, wherein at temperatures above 200° C. the PNA rear-brick releases stored NOx into the TEG.

14. The process of claim 12, wherein at a temperature of 400° C. or less, the PNA rear-brick releases substantially all stored NOx into the TEG.

15. The process of claim 12, wherein the diesel engine is substantially always running with a lean air to fuel ratio.

16. An exhaust system for treating exhaust gases from a diesel engine, comprising:
a passive NOx adsorber (PNA) layer disposed on a substrate and configured to store NOx from the exhaust gases at temperatures up to 150° C.;
a diesel oxidation catalyst (DOC) layer disposed over the PNA layer and configured to contact the exhaust gases before they contact the PNA layer and to oxidize hydrocarbons in the exhaust gases; and
a selective catalytic reduction (SCR) system downstream from the PNA and DOC layers and configured to reduce NOx in the exhaust gases;
wherein the PNA layer and the DOC layer each include palladium and platinum and have a palladium to platinum content of at least 3:1.

17. The system of claim 16, wherein the exhaust system emits less than 10 ppm of $N_2O$ throughout a first 2,000 seconds after engine start.

* * * * *